United States Patent
Kim

(10) Patent No.: US 11,018,435 B2
(45) Date of Patent: May 25, 2021

(54) ANTENNA AND VEHICLE HAVING THE SAME

(71) Applicants: HYUNDAI MOTOR COMPANY, Seoul (KR); KIA MOTORS CORPORATION, Seoul (KR)

(72) Inventor: Dongjin Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 282 days.

(21) Appl. No.: 16/377,657

(22) Filed: Apr. 8, 2019

(65) Prior Publication Data

US 2020/0136265 A1    Apr. 30, 2020

(30) Foreign Application Priority Data

Oct. 25, 2018    (KR) .................. 10-2018-0128121

(51) Int. Cl.
| | | |
|---|---|---|
| H01Q 21/00 | (2006.01) |
| H01Q 1/32 | (2006.01) |
| H01Q 21/06 | (2006.01) |
| H01Q 3/24 | (2006.01) |
| H01Q 21/20 | (2006.01) |
| H01Q 19/30 | (2006.01) |
| H04W 4/40 | (2018.01) |

(52) U.S. Cl.
CPC .......... *H01Q 21/0006* (2013.01); *H01Q 1/32* (2013.01); *H01Q 1/3233* (2013.01); *H01Q 3/242* (2013.01); *H01Q 19/30* (2013.01); *H01Q 21/061* (2013.01); *H01Q 21/20* (2013.01); *H01Q 21/205* (2013.01); *H04W 4/40* (2018.02)

(58) Field of Classification Search
CPC ........ H01Q 3/24; H01Q 19/30; H01Q 21/205; H01Q 1/3233; H01Q 1/32; H01Q 3/242; H01Q 21/20; H01Q 21/0006; H01Q 21/061
See application file for complete search history.

(56) References Cited

U.S. PATENT DOCUMENTS

| | | | | |
|---|---|---|---|---|
| 6,498,589 B1 * | 12/2002 | Horii | ...... | H01Q 3/242 343/727 |
| 7,388,552 B2 * | 6/2008 | Mori | ...... | H01Q 13/10 343/767 |
| 7,477,204 B2 * | 1/2009 | Lin | ...... | H01Q 3/242 343/795 |
| 8,279,137 B2 * | 10/2012 | DeJean, II | ...... | H01Q 19/28 343/912 |
| 9,112,264 B2 * | 8/2015 | Wang | ...... | H01Q 19/30 |

(Continued)

*Primary Examiner* — Ab Salam Alkassim, Jr.
(74) *Attorney, Agent, or Firm* — Morgan, Lewis & Bockius LLP

(57) ABSTRACT

A directional antenna apparatus capable of radiating radio signals in various directions may include first, second, third and fourth main director elements forming a square; first, second, third and fourth sub-director elements extending from the center portion of the square to the first, second, third and fourth main director elements, respectively, inside the square; first, second, third and fourth radiators disposed in parallel with the first, second, third and fourth main director elements, respectively, outside the square; and a selection switch configured to selectively connect any one of the first, second, third and fourth radiators to an external device.

20 Claims, 10 Drawing Sheets

(56) References Cited

U.S. PATENT DOCUMENTS

| | | | |
|---|---|---|---|
| 9,263,798 B1* | 2/2016 | Piazza | H01Q 3/24 |
| 9,912,080 B2* | 3/2018 | Louzir | H01Q 25/005 |
| 2003/0090423 A1* | 5/2003 | Horii | H01Q 9/26 |
| | | | 343/727 |
| 2004/0125036 A1* | 7/2004 | Chiang | H01Q 1/2258 |
| | | | 343/757 |
| 2005/0162327 A1* | 7/2005 | Mori | H01Q 9/0442 |
| | | | 343/770 |
| 2005/0237258 A1* | 10/2005 | Abramov | H01Q 3/242 |
| | | | 343/834 |
| 2006/0044200 A1* | 3/2006 | Mori | H01Q 13/10 |
| | | | 343/770 |
| 2007/0103377 A1* | 5/2007 | Abramov | H01Q 25/00 |
| | | | 343/818 |
| 2007/0152903 A1* | 7/2007 | Lin | H01Q 19/30 |
| | | | 343/795 |
| 2011/0193761 A1* | 8/2011 | Shinkai | H01Q 9/16 |
| | | | 343/817 |
| 2013/0069826 A1* | 3/2013 | Wang | H01Q 3/24 |
| | | | 342/374 |
| 2014/0118191 A1* | 5/2014 | Smith | H01Q 19/30 |
| | | | 342/372 |
| 2014/0159958 A1* | 6/2014 | Haziza | H01Q 3/24 |
| | | | 342/374 |
| 2017/0033471 A1* | 2/2017 | Huang | H01Q 9/26 |
| 2017/0062924 A1* | 3/2017 | Lee | H01Q 19/28 |
| 2019/0131720 A1* | 5/2019 | Yu | H01Q 3/24 |
| 2019/0280394 A1* | 9/2019 | Cheng | H01Q 21/062 |

* cited by examiner

ANTENNA AND VEHICLE HAVING THE SAME

CROSS-REFERENCE TO RELATED APPLICATION(S)

The present application claims priority to Korean Patent Application No. 10-2018-0128121, filed on Oct. 25, 2018 in the Korean Intellectual Property Office, the entire contents of which is incorporated herein for all purposes by this reference.

BACKGROUND OF THE INVENTION

Field of the Invention

The present invention relates to an antenna and a vehicle having the same, and more particularly, to an antenna configured for changing a radiation direction of radio waves and a vehicle having the same.

Description of Related Art

A vehicle is a transportation means for driving on a road and railway using fossil fuel and electricity as a power source.

Recently, it has been common for the vehicle to include an audio device and a video device to allow a driver to listen to music and to watch a video, as well as to transport cargo and people. Furthermore, a navigation system has been widely disposed in the vehicle to display a route to a destination which is desired by the driver.

Recently, there is growing demand for the vehicle to communicate with an external device (vehicle-to-everything communication, V2X communication). For example, in the case of a navigation function to guide the route to the destination, information about traffic conditions of the road is required to find the optimal route. Since the traffic conditions are frequently changed, it may be required for the vehicle to acquire the information about the traffic conditions in real time.

The V2X communication is characterized by various targets of communication. Particularly, in order to communicate with driving peripheral vehicles, the V2X communication requires an antenna for radiating radio signals in all directions. However, the antennae that radiate in all directions (omnidirectional antenna) are not efficient. For example, the omnidirectional antenna is capable of communication in all directions, while a communication distance is short.

On the other hand, a directional antenna has a long communication distance in a specific direction, but it is difficult to radiate radio signals in various directions.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a directional antenna configured for radiating radio signals in various directions.

Additional aspects of the disclosure will be set forth in portion in the description which follows and, in part, will be obvious from the description, or may be learned by practice of the disclosure.

In accordance with an aspect of the present invention, an antenna may include: first, second, third and fourth main director elements forming a square; first, second, third and fourth sub-director elements extending from the center portion of the square to the first, second, third and fourth main director elements, respectively, inside the square; first, second, third and fourth radiators disposed in parallel with the first, second, third and fourth main director elements, respectively, outside the square; and a selection switch configured to selectively connect any one of the first, second, third and fourth radiators to an external device.

The first, second, third and fourth main director elements each may have a length of a half wavelength of a radio signal. The first, second, third and fourth sub-director elements each may have a length of a quarter wavelength of the radio signal.

The first, second, third and fourth radiators may include a pair of bars disposed in parallel. The antenna may further include: first, second, third and fourth power feeders each formed between the pair of bars of the first, second, third and fourth radiators.

The first, second, third and fourth power feeders may respectively connect the selection switch.

The selection switch may connect any one of the first, second, third and fourth power feeders to the external device.

Each of the pair of bars of the first, second, third and fourth radiators may have a length of a half wavelength of a radio signal. Each of the pair of bars may be folded 180° at the center.

The antenna may further include: first, second, third and fourth main switches disposed at the vertices of the square, configured to allow or block connection between the adjacent main director elements; and first and second sub switches disposed at the center portion of the square, configured to allow or block connection between the sub-director elements disposed in series with each other.

The first main switch may allow or block connection between the first main director element and the second main director element. The second main switch may allow or block connection between the second main director element and the third main director element. The third main switch may allow or block connection between the third main director element and the fourth main director element. The fourth main switch may allow or block connection between the fourth main director element and the first main director element. The first sub switch may allow or block connection between the first sub-director element and the third sub-director element. The second sub switch may allow or block connection between the second sub-director element and the fourth sub-director element.

When the first radiator is connected to the external device by the selection switch, the first and fourth main switches may turn on and the second and third main switches may turn off, and the first sub switch may turn off and the second sub switch may turn on.

When the first radiator is connected to the external device, the first main director element may connect to the second and fourth main director elements, and the second sub-director element may connect to the fourth sub-director element.

In accordance with another aspect of the present invention, a vehicle may include: an antenna; and a communication device configured to control the antenna and transmit/receive a communication signal through the antenna. The antenna may include first, second, third and fourth main director elements forming a square; first, second, third and fourth sub-director elements extending from the center portion of the square to the first, second, third and fourth main director elements, respectively, inside the square; first, second, third and fourth radiators disposed in parallel with the first, second, third and fourth main director elements, respectively, outside the square; and a selection switch configured to selectively connect any one of the first, second, third and fourth radiators with the communication device according to the control of the communication device.

The antennal may further include first, second, third and fourth main switches disposed at the vertices of the square, configured to allow or block connection between the adjacent main director elements according to the control of the communication device; and first and second sub switches disposed at the center portion of the square, configured to allow or block connection between the sub-director elements disposed in series with each other according to the control of the communication device.

The first main switch may allow or block connection between the first main director element and the second main director element according to the control of the communication device. The second main switch may allow or block connection between the second main director element and the third main director element according to the control of the communication device. The third main switch may allow or block connection between the third main director element and the fourth main director element according to the control of the communication device. The fourth main switch may allow or block connection between the fourth main director element and the first main director element according to the control of the communication device. The first sub switch may allow or block connection between the first sub-director element and the third sub-director element according to the control of the communication device. The second sub switch may allow or block connection between the second sub-director element and the fourth sub-director element according to the control of the communication device.

The communication device may connect the first radiator to the communication device through the selection switch, turn on the first and fourth main switches and turn off the second and third main switches, and turn off the first sub switch and turn on the second sub switch.

The communication device may connect the first radiator to the external device, connect the first main director element to the second and fourth main director elements, and connect the second sub-director element to the fourth sub-director element.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
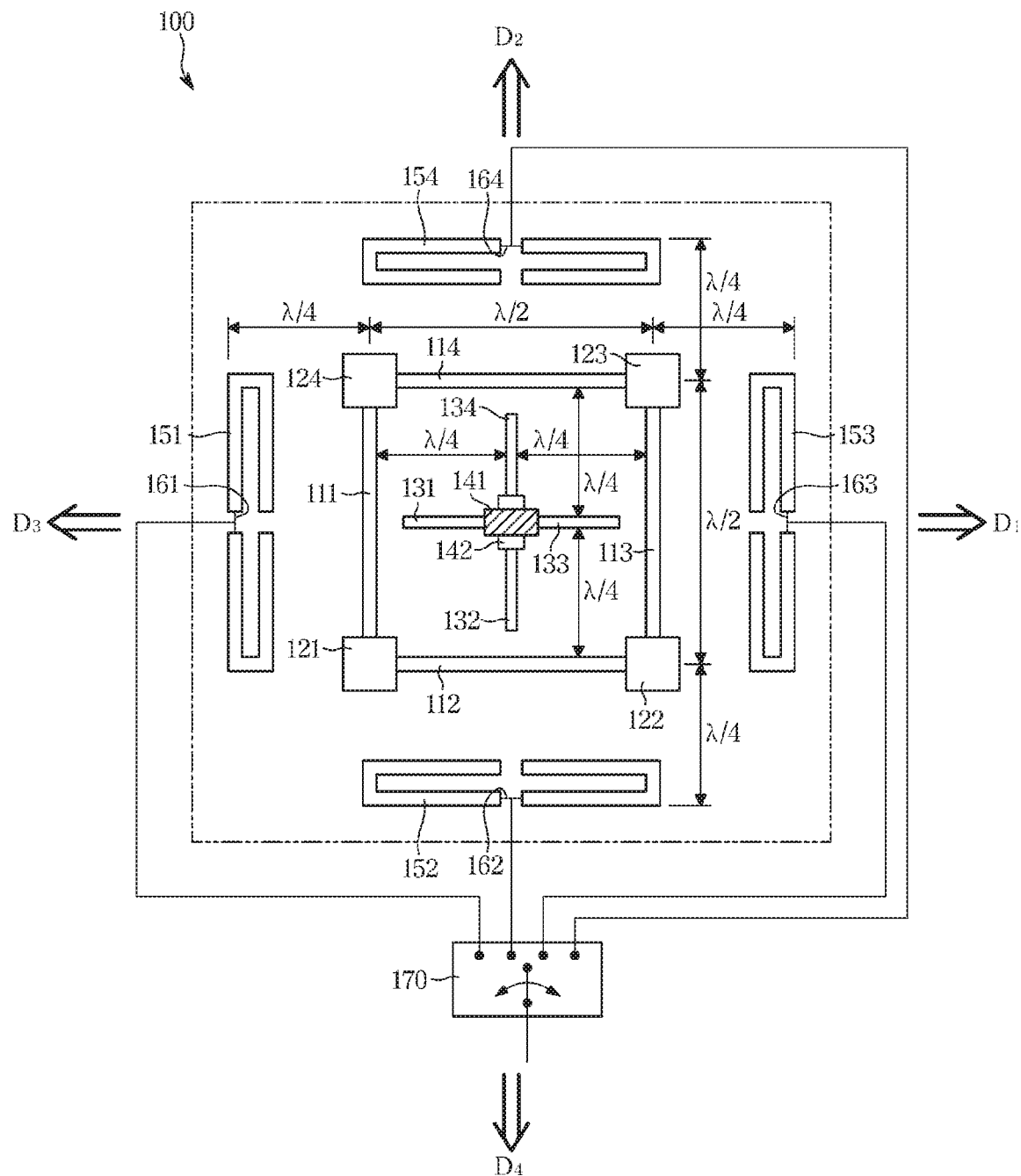
FIG. 1 is a view exemplarily illustrating a vehicle antenna according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; However, the sequence of and/or operations is not limited to that set forth herein and may be changed as is known in the art, with the exception of operations necessarily occurring in a particular order. Furthermore, respective descriptions of well-known functions and constructions may be omitted for increased clarity and conciseness.

Additionally, various exemplary embodiments will now be described more fully hereinafter with reference to the accompanying drawings. The exemplary embodiments may, however, be embodied in various forms and should not be construed as being limited to the exemplary embodiments set forth herein. These embodiments are provided so that the present disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it may be directly connected or coupled to the other element or intervening elements may be present. In contrast, when an element is referred to as being "directly connected," or "directly coupled," to another element, there are no intervening elements present.

The terminology used herein is for the purpose of describing various exemplary embodiments only and is not intended to be limiting. As used herein, the singular forms "a," "an," and "the," are intended to include the plural forms as well, unless the context clearly indicates otherwise.

Reference will now be made in detail to the exemplary embodiments of the present invention, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, an operation principle and embodiments of the present invention will be described with reference to the accompanying drawings.

FIG. 1 is a view exemplarily illustrating a vehicle antenna according to an exemplary embodiment of the present invention.

An antenna 100 may receive an electric signal from a communication device or a radar device and radiate a radio signal (radio waves or electromagnetic waves) corresponding to the received electric signal to a free space. The antenna 100 may also obtain the radio signal from the free space and transmit the electric signal corresponding to the obtained radio signal to the communication device or the radar device.

The antenna 100 may radiate the radio signal in a specific direction and may obtain the radio signal from the specific direction thereof. In other words, the antenna 100 may have directivity.

The antenna 100 may have the directivity in a plurality of directions. For example, the antenna 100 may have the directivity in a first direction D1 and the directivity in a third direction D3. The antenna 100 may have the directivity in a second direction D2 and the directivity in a fourth direction D4. The antenna 100 may also have the directivity in the first direction D1, the directivity in the second direction D2, the directivity in the third direction D3, and the directivity in the fourth direction D4.

The antenna 100 may have symmetry in four directions of the first, second, third and fourth directions D1, D2, D3 and D4 as illustrated in FIG. 1.

The antenna 100 may include four main director elements 111, 112, 113 and 114 provided on four sides of a substantially square shape. The antenna 100 may include the first main director element 111, the second main director element 112, the third main director element 113 and the fourth main director element 114.

The first, second, third and fourth main director elements 111, 112, 113 and 114 may be disposed on four sides of the substantially square shape. The first main director element 111 and the second main director element 112 may be adjacent to each other and the longitudinal direction of the first main director element 111 and the longitudinal direction of the second main director element 112 may be perpendicular to each other. The second main director element 112 and the third main director element 113 may be adjacent to each other and the longitudinal direction of the second main director element 112 and the longitudinal direction of the third main director element 113 may be perpendicular to each other. The third main director element 113 and the fourth main director element 114 may be adjacent to each other and the longitudinal direction of the third main director element 113 and the longitudinal direction of the fourth main director element 114 may be perpendicular to each other. The fourth main director element 114 and the first main director element 111 may be adjacent to each other and the longitudinal direction of the fourth main director element 114 and the longitudinal direction of the first main director element 111 may be perpendicular to each other.

The first, second, third and fourth main director elements 111, 112, 113 and 114 may be formed of electrically conductive material such as a metal.

Also, the first, second, third and fourth main director elements 111, 112, 113 and 114 may have substantially the same length. Each of the first, second, third and fourth main director elements 111, 112, 113 and 114 may have a length of approximately a half wavelength ($\lambda/2$) of the radio signal transmitted and received by the antenna 100.

The antenna 100 may include four main switches 121, 122, 123 and 124 provided between the four main director elements 111, 112, 113 and 114. The antenna 100 may include the first main switch 121, the second main switch 122, the third main switch 123 and the fourth main switch 124.

The first, second, third and fourth main switches 121, 122, 123 and 124 may be disposed on four vertices of the substantially square shape formed by the first, second, third and fourth main director elements 111, 112, 113 and 114, respectively. The first main switch 121 may be disposed between the first main director element 111 and the second main director element 112. The second main switch 122 may be disposed between the second main director element 112 and the third main director element 113. The third main switch 123 may be disposed between the third main director element 113 and the fourth main director element 114. The fourth main switch 124 may be disposed between the fourth main director element 114 and the first main director element 111.

The first, second, third and fourth main switches 121, 122, 123 and 124 may allow or block the connection of the adjacent main director elements 111, 112, 113 and 114. The first main switch 121 may connect or disconnect the first main director element 111 and the second main director element 112. The second main switch 122 may connect or disconnect the second main director element 112 and the third main director element 113. The third main switch 123 may connect or disconnect the third main director element 113 and the fourth main director element 114. The fourth main switch 124 may connect or disconnect the fourth main director element 114 and the first main director element 111.

Each of the first, second, third and fourth main switches 121, 122, 123 and 124 may be a metal oxide semiconductor field effect transistor (MOSFET), a bipolar junction transistor (BJT) or a pin diode (PIN Diode).

The antenna 100 may include four sub-director elements 131, 132, 133 and 134 provided inside a square formed by the four main director elements 111, 112, 113 and 114. The antenna 100 may include the first sub-director element 131, the second sub-director element 132, the third sub-director element 133, and the fourth sub-director element 134.

The first, second, third and fourth sub-director elements 131, 132, 133 and 134 may be disposed as a cross shape in the square formed by the four main director elements 111, 112, 113 and 114. The first sub-director element 131, the second sub-director element 132, the third sub-director element 133 and the fourth sub-director element 134 may be disposed radially from the internal center of the square.

The first, second, third and fourth sub-director elements 131, 132, 133 and 134 may extend toward the respective sides of the square formed by the first, second, third and fourth main director elements 111, 112, 113 and 114, respectively. The first sub-director element 131 may extend from the center portion of the square formed by the first, second, third and fourth main director elements 111, 112, 113 and 114 toward the first main director element 111. The second sub-director element 132 may extend from the center portion of the square formed by the first, second, third and fourth main director elements 111, 112, 113 and 114 toward the second main director element 112. The third sub-director element 133 may extend from the center portion of the square formed by the first, second, third and fourth main director elements 111, 112, 113 and 114 toward the third main director element 113. The fourth sub-director element 134 may extend from the center portion of the square formed by the first, second, third and fourth main director elements 111, 112, 113 and 114 toward the fourth main director element 114.

The first sub-director element 131 and the third sub-director element 133 may be disposed in series in the longitudinal direction and may be disposed in parallel with the second main director element 112 and the fourth main director element 114. The first sub-director element 131 and the third sub-director element 133 may be positioned substantially at the center between the second main director element 112 and the fourth main director element 114. The second sub-director element 132 and the fourth sub-director element 134 may be disposed in series in the longitudinal direction and may be disposed parallel with the first main director element 111 and the third main director element 113. The second sub-director element 132 and the fourth sub-director element 134 may be positioned substantially at the center between the first main director element 111 and the third main director element 113.

The first, second, third and fourth sub-director elements 131, 132, 133 and 134 may be formed of electrically conductive material such as the metal.

Furthermore, the first, second, third and fourth sub-director elements 131, 132, 133 and 134 may have substantially the same length. Each of the first, second, third and fourth sub-director elements 131, 132, 133 and 134 may be slightly shorter than approximately half of each of the first, second, third and fourth main director elements 111, 112, 113 and 114 so that the first, second, third and fourth sub-director elements 131, 132, 133 and 134 are not in contact with the first, second, third and fourth main director elements 111, 112, 113 and 114. For example, each of the first, second, third and fourth sub-director elements 131, 132, 133 and 134 may have a length of 90% of approximately a quarter wavelength ($\lambda/4$) of the radio signal transmitted and received by the antenna 100.

The antenna 100 may include two sub switches 141 and 142 provided between the four sub-director elements 131, 132, 133, and 134. The antenna 100 may include the first sub switch 141 and the second sub switch 142.

The first and second sub switches 141 and 142 may be disposed substantially in the center portion of the cross shape formed by the first, second, third and fourth main director elements 111, 112, 113 and 114. The first sub switch 141 may be disposed between the first sub-director element 131 and the third sub-director element 133. The second sub switch 142 may be disposed between the second sub-director element 132 and the fourth sub-director element 134.

The first and second sub switches 141 and 142 may allow or block the connection of the four sub-director elements 131, 132, 133 and 134 disposed side by side thereof. The first sub switch 141 may connect or disconnect the first sub-director element 131 and the third sub-director element 133. The second sub switch 142 may connect or disconnect the second sub-director element 132 and the fourth sub-director element 134.

Each of the first and second sub switches 141 and 142 may include the metal oxide semiconductor field effect transistor, the bipolar junction transistor or the pin diode.

The antenna 100 may include four radiators 151, 152, 153 and 154 provided outside the square formed by the four main director elements 111, 112, 113 and 114. The antenna 100 may include the first radiator 151, the second radiator 152, the third radiator 153 and the fourth radiator 154.

The first, second, third and fourth radiators 151, 152, 153 and 154 may be disposed in parallel with the four main director elements 111, 112, 113 and 114 outside the four main director elements 111, 112, 113 and 114, respectively. The first radiator 151 may be disposed outside the first main director element 111 and in parallel with the first main director element 111. The second radiator 152 may be disposed outside the second main director element 112 and in parallel with the second main director element 112. The third radiator 153 may be disposed outside the third main director element 113 and in parallel with the third main director element 113. The fourth radiator 154 may be disposed outside the fourth main director element 114 and in parallel with the fourth main director element 114.

The first, second, third and fourth radiators 151, 152, 153 and 154 may be spaced from the first, second, third and fourth main director elements 111, 112, 113 and 114 by approximately the quarter wavelength ($\lambda/4$) of the radio signal transmitted and received by the antenna 100. The first radiator 151 may be disposed outside the first main director element 111, spaced from the first main director element 111 by approximately the quarter wavelength ($\lambda/4$) of the radio signal. The second radiator 152 may be disposed outside the second main director element 112, spaced from the second main director element 112 by approximately the quarter wavelength ($\lambda/4$) of the radio signal. The third radiator 153 may be disposed outside the third main director element 113, spaced from the third main director element 113 by approximately the quarter wavelength ($\lambda/4$) of the radio signal. The fourth radiator 154 may be disposed outside the fourth main director element 114, spaced from the fourth main director element 114 by approximately the quarter wavelength ($\lambda/4$) of the radio signal.

The first, second, third and fourth radiators 151, 152, 153 and 154 may include a pair of bars disposed in parallel in the longitudinal direction thereof. The length of each of the pair of bars may have the length of approximately the half wavelength ($\lambda/2$) of the radio signal, and the total length of each of the first, second, third and fourth radiators 151, 152, 153 and 154 may have a length of approximately a wavelength ($\lambda$) of the radio signal.

First, second, third and fourth power feeders 161, 162, 163 and 164 may be provided at the center portion of the first, second, third and fourth radiators 151, 152, 153 and 154, that is, at portions where the pair of bars is connected to each other. The first power feeder 161 may be provided at the center portion of the first radiator 151. The second power feeder 162 may be provided at the center portion of the second radiator 152. The third power feeder 163 may be provided at the center portion of the third radiator 153. The fourth power feeder 164 may be provided at the center portion of the fourth radiator 154.

The pair of bars included in each of the first, second, third and fourth radiators 151, 152, 153 and 154 are each folded at the center. For example, the pair of bars included in each of the first, second, third and fourth radiators 151, 152, 153 and 154 may be folded 180° inwardly of the antenna 100 at the center. Furthermore, the pair of bars included in each of the first, second, third, and fourth radiators 151, 152, 153 and 154 may be folded 180° outward of the antenna 100 at the center.

In other words, each of the first, second, third and fourth radiators 151, 152, 153 and 154 may be folded at one quarter point of the entire length from one end and folded again at three quarters of the entire length from one end. As a result, the length from one end of the first, second, third and fourth radiators 151, 152, 153 and 154 to the other end may be equal to approximately the half wavelength ($\lambda/2$) of the radio signal, and the length from one side edge of the first, second, third and fourth radiators 151, 152, 153 and 154 to the other side edge may be equal to approximately the quarter wavelength ($\lambda/4$) of the radio signal.

The antenna 100 may also include a selection switch 170 for selecting any one of the first, second, third and fourth radiators 151, 152, 153 and 154.

The selection switch 170 may be connected to the first, second, third, and fourth power feeders 161, 162, 163 and 164, and may connect any one of the first, second, third, and fourth power feeders 161, 162, 163 and 164 to the external device.

When the first power feeder 161 and the external device are connected by the selection switch 170, the first radiator 151 may be activated and the second, third and fourth radiators 152, 153 and 154 may be deactivated.

When the second power feeder 162 and the external device are connected by the selection switch 170, the second radiator 152 may be activated and the first, third and fourth radiators 151, 153 and 154 may be deactivated.

When the third power feeder 163 and the external device are connected by the selection switch 170, the third radiator 153 may be activated and the first, second and fourth radiators 151, 152 and 154 may be deactivated.

When the fourth power feeder 164 and the external device are connected by the selection switch 170, the fourth radiator 154 may be activated and the first, second, and third radiators 151, 152 and 153 may be deactivated.

The first radiator 151, the first main director element 111, the second/the fourth sub-director elements 132/134, the third main director element 113 and the third radiator 153 may be disposed in parallel with each other in order.

The first radiator 151, the first main director element 111, the second/the fourth sub-director elements 132/134, the third main director element 113 and the third radiator 153 may be spaced from each other by approximately the quarter wavelength ($\lambda/4$) of the radio signal. The first radiator 151 and the first main director element 111 may be spaced apart by approximately the quarter wavelength ($\lambda/4$) of the radio signal. The first main director element 111 and the second/the fourth sub-director elements 132/134 may be spaced apart by approximately the quarter wavelength ($\lambda/4$) of the radio signal. The second/the fourth sub-director elements 132/134 and the third main director element 113 may be spaced apart by approximately the quarter wavelength ($\lambda/4$) of the radio signal. The third main director element 113 and the third radiator 153 may be spaced apart by approximately the quarter wavelength ($\lambda/4$) of the radio signal.

Thus, the first radiator 151, the first main director element 111, the second/the fourth sub-director elements 132/134, the third main director element 113 and the third radiator 153 may form a Yagi-Uda antenna.

When a signal is supplied to the first radiator 151, the first main director element 111, the second/the fourth sub-director elements 132/134, the third main director element 113 and the third radiator 153 may induce radio waves radiated from the first radiator 151 toward the first direction D1. As a result, the antenna 100 may have the directivity toward the first direction D1.

When a signal is supplied to the third radiator 153, the third main director element 113, the second/the fourth sub-director elements 132/134, the first main director element 111 and the first radiator 151 may induce radio waves radiated from the third radiator 153 toward the third direction D3. As a result, the antenna 100 may have the directivity toward the third direction D3.

The second radiator 152, the second main director element 112, the first/the third sub-director elements 131/133, the fourth main director element 114 and the fourth radiator 154 may be disposed in parallel with each other in order.

The second radiator 152, the second main director element 112, the first/the third sub-director elements 131/133, the fourth main director element 114 and the fourth radiator 154 may be spaced from each other by approximately the quarter wavelength ($\lambda/4$) of the radio signal. The second radiator 152 and the second main director element 112 may be spaced apart by approximately the quarter wavelength ($\lambda/4$) of the radio signal. The second main director element 112 and the first/the third sub-director elements 131/133 may be spaced apart by approximately the quarter wavelength ($\lambda/4$) of the radio signal. The first/the third sub-director elements 131/133 and the fourth main director element 114 may be spaced apart by approximately the quarter wavelength ($\lambda/4$) of the radio signal. The fourth main director element 114 and the fourth radiator 154 may be spaced apart by approximately the quarter wavelength ($\lambda/4$) of the radio signal.

Thus, the second radiator 152, the second main director element 112, the first/the third sub-director elements 131/133, the fourth main director element 114 and the fourth radiator 154 may form the Yagi-Uda antenna.

When the signal is supplied to the second radiator 152, the second radiator 152, the second main director element 112, the first/the third sub-director elements 131/133, the fourth main director element 114 and the fourth radiator 154 may induce radio waves radiated from the second radiator 152 toward the second direction D2. As a result, the antenna 100 may have the directivity toward the second direction D2.

When the signal is supplied to the fourth radiator 154, the second radiator 152, the second main director element 112, the first/the third sub-director elements 131/133, the fourth main director element 114 and the fourth radiator 154 may induce radio waves radiated from the fourth radiator 154 toward the fourth direction D4. As a result, the antenna 100 may have the directivity toward the fourth direction D4.

In the above, the antenna 100 may include the first, second, third and fourth radiators 151, 152, 153 and 154, but is not limited thereto. At least some of the first, second, third and fourth radiators 151, 152, 153 and 154 may be omitted.

For example, the fourth radiator 154 may be omitted, whereby the antenna 100 may radiate radio waves in the first direction D1, the second direction D2, and the third direction D3. Also, the third and fourth radiators 154 may be omitted, whereby the antenna 100 may radiate radio waves in the first direction D1 and the second direction D2.

Figure 2:
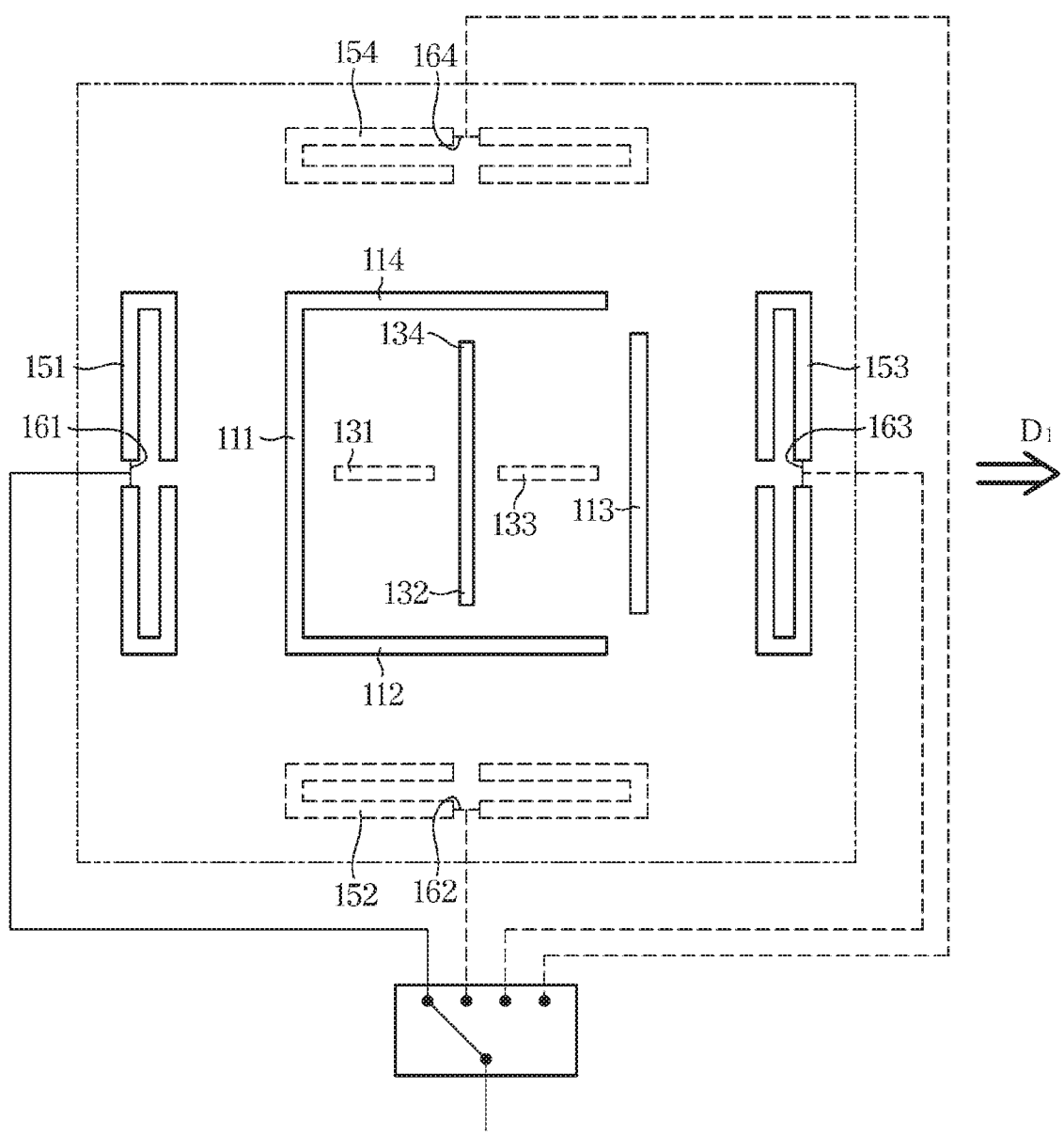
FIG. 2 is a view exemplarily illustrating that the vehicle antenna radiates radio signals in a first direction according to an exemplary embodiment of the present invention.

FIG. 2 is a view exemplarily illustrating that the vehicle antenna radiates radio signals in a first direction according to an exemplary embodiment of the present invention. FIG. 2 illustrates that the antenna 100 radiates radio waves in the first direction D1 and receives radio waves from the first direction D1.

As illustrated in FIG. 2, the first radiator 151 may be activated and the second, third and fourth radiators 152, 153 and 154 may be deactivated to radiate radio waves toward the first direction D1. To activate the first radiator 151, the selection switch 170 may connect the first power feeder 161 with the external device. The first radiator 151 may radiate radio waves.

The first main director element 111 disposed in parallel with the first radiator 151 and the second and fourth main director elements 112 and 114 disposed perpendicularly to the first radiator 151 may be electrically connected to induce the radio waves radiated from the first radiator 151 in the first direction D1. The first main switch 121 between the first main director element 111 and the second main director element 112 may be turned on. The fourth main switch 124 between the first main director element 111 and the fourth main director element 114 may be turned on.

The third main director element 113 and the second and fourth main director elements 112 and 114 disposed in parallel with the first radiator 151 may be separated from each other. The second main switch 122 between the third main director element 113 and the second main director element 112 may be turned off. The third main switch 123 between the third main director element 113 and the fourth main director element 114 may be turned off.

As a result, the first main director element 111, the second main director element 112 and the fourth main director element 114 may integrally induce the radio waves radiated from the first radiator 151 in the first direction D1, and the third main director element 113 may independently induce the radio waves radiated from the first radiator 151 in the first direction D1.

The second sub-director element 132 and the fourth sub-director element 134 disposed in parallel with the first radiator 151 may be connected to induce the radio waves radiated from the first radiator 151 in the first direction D1. The second sub switch 142 between the second sub-director element 132 and the fourth sub-director element 134 may be turned on.

The first sub-director element 131 and the third sub-director element 133 disposed perpendicularly to the first radiator 151 may be separated from each other. The first sub switch 141 between the first sub-director element 131 and the third sub-director element 133 may be turned off.

As a result, the second sub-director element 132 and the fourth sub-director element 134 may integrally induce the radio waves radiated from the first radiator 151 in the first direction D1. Also, the first sub-director element 131 and the third sub-director element 133 may not be involved in the operation of the antenna 100.

The deactivated third radiator 153 may be connected to the pair of bars and may independently induce the radio waves radiated from the first radiator 151 in the first direction D1. The deactivated second and fourth radiators 152 and 154 may not be involved in the operation of the antenna 100.

As mentioned above, the first radiator 151 may radiate the radio waves, and the fourth/the first/the second main director elements 114, 111 and 112, the second/the fourth sub-director elements 132 and 134, the third main director element 113 and the third radiator 153 may induce the radio waves radiated from the first radiator 151 in the first direction D1.

Figure 3:
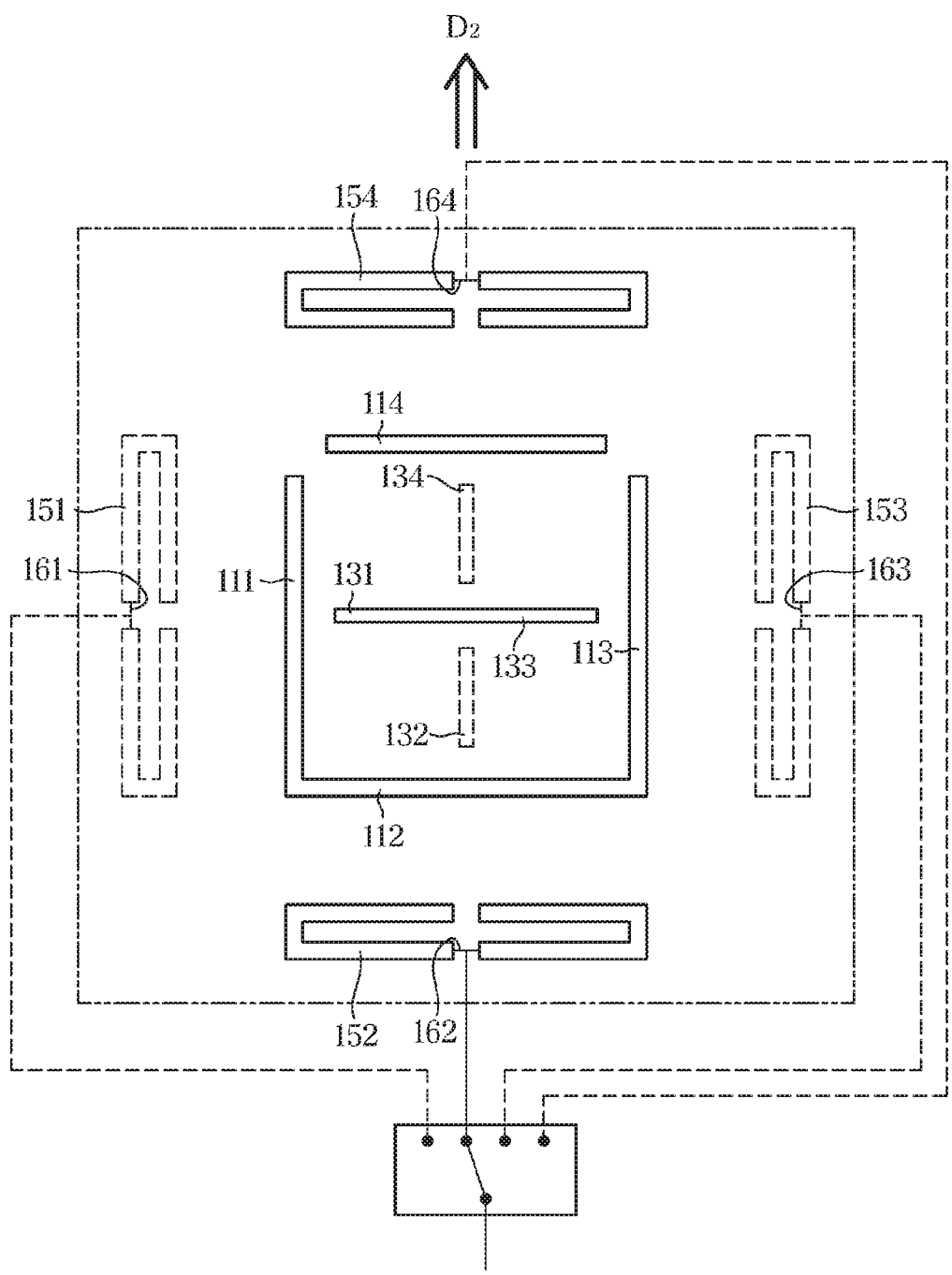
FIG. 3 is a view exemplarily illustrating that the vehicle antenna radiates radio signals in a second direction according to an exemplary embodiment of the present invention.

FIG. 3 is a view exemplarily illustrating that the vehicle antenna radiates radio signals in a second direction according to an exemplary embodiment of the present invention. FIG. 3 illustrates that the antenna 100 radiates radio waves in the second direction D2 and receives radio waves from the second direction D2.

As illustrated in FIG. 3, the selection switch 170 may connect the second power feeder 162 with the external device. The second radiator 152 may radiate the radio waves.

The first main switch 121 between the first main director element 111 and the second main director element 112 may be turned on. The second main switch 122 between the second main director element 112 and the third main director element 113 may be turned on. The third main switch 123 between the fourth main director element 114 and the third main director element 113 may be turned off. The fourth main switch 124 between the fourth main director element 114 and the first main director element 111 may be turned off. As a result, the first main director element 111, the second main director element 112 and the third main director element 113 may integrally induce the radio waves radiated from the second radiator 152 in the second direction D2, and the fourth main director element 114 may independently induce the radio waves radiated from the second radiator 152 in the second direction D2.

The first sub switch 141 between the first sub-director element 131 and the third sub-director element 133 may be turned on and the second sub switch 142 between the second sub-director element 132 and the fourth sub-director element 134 may be turned off. As a result, the first sub-director element 131 and the third sub-director element 133 may integrally induce the radio waves radiated from the second radiator 152 in the second direction D2. The second sub-director element 132 and the fourth sub-director element 134 may not be involved in the operation of the antenna 100.

The deactivated fourth radiator 154 may be connected to the pair of bars and may independently induce the radio waves radiated from the second radiator 152 in the second direction D2. The deactivated first and third radiators 151 and 153 may not be involved in the operation of the antenna 100.

As mentioned above, the second radiator 152 may radiate the radio waves, and the first/the second/the third main director elements 111, 112 and 113, the first/the third sub-director elements 131 and 133, the fourth main director element 114 and the fourth radiator 154 may induce the radio waves radiated from the second radiator 152 in the second direction D2.

Figure 4:
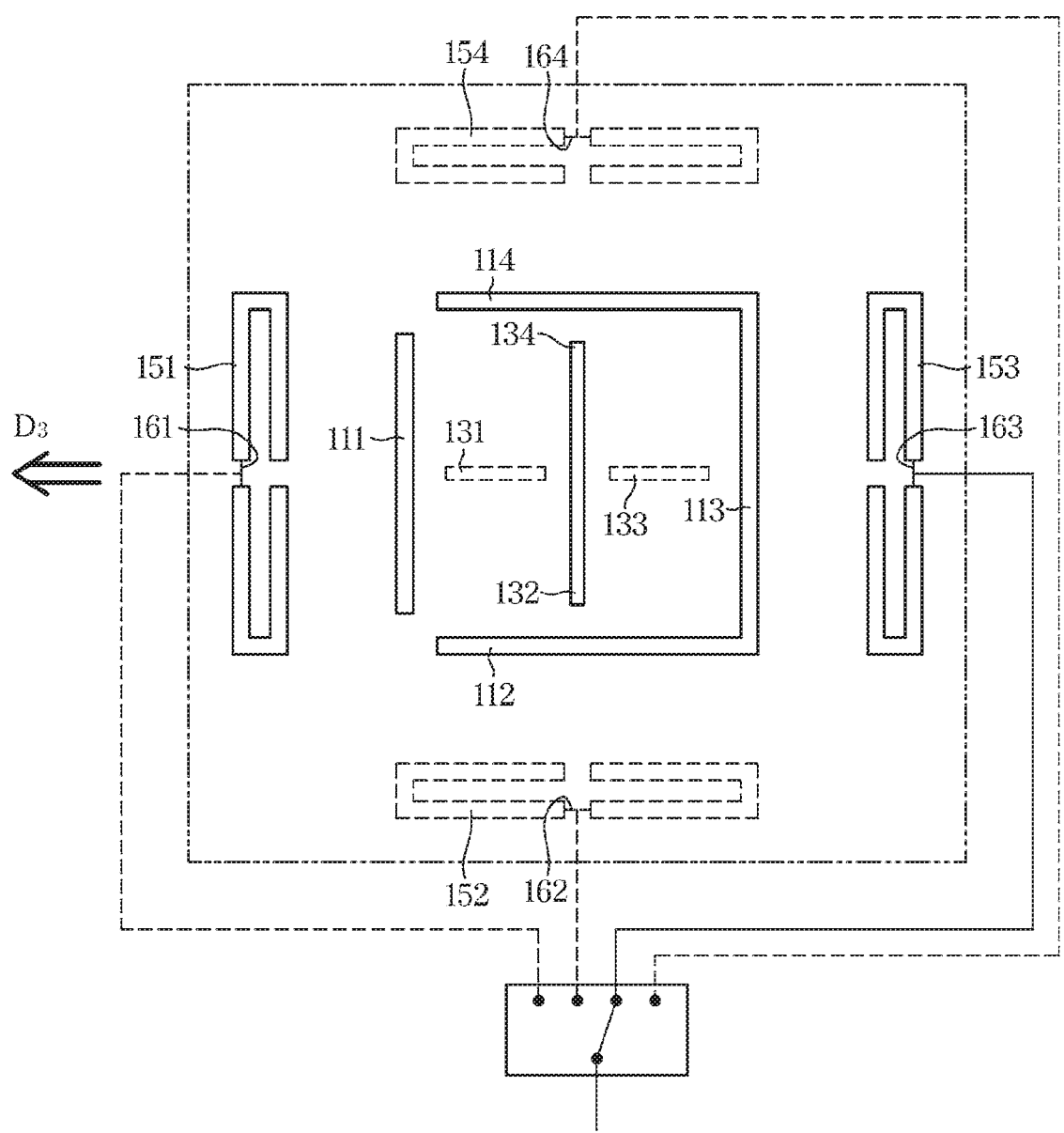
FIG. 4 is a view exemplarily illustrating that the vehicle antenna radiates radio signals in a third direction according to an exemplary embodiment of the present invention.

FIG. 4 is a view exemplarily illustrating that the vehicle antenna radiates radio signals in a third direction according to an exemplary embodiment of the present invention. FIG. 4 illustrates that the antenna 100 radiates radio waves in the third direction D3 and receives radio waves from the third direction D3.

As illustrated in FIG. 4, the selection switch 170 may connect the third power feeder 163 with the external device. The third radiator 153 may radiate the radio waves.

The second main switch 122 between the third main director element 113 and the second main director element 112 may be turned on. The third main switch 123 between the third main director element 113 and the fourth main director element 114 may be turned on. The first main switch 121 between the first main director element 111 and the second main director element 112 may be turned off. The fourth main switch 124 between the first main director element 111 and the fourth main director element 114 may be turned off. As a result, the second main director element 112, the third main director element 113 and the fourth main director element 114 may integrally induce the radio waves radiated from the third radiator 153 in the third direction D3, and the first main director element 111 may independently induce the radio waves radiated from the third radiator 153 in the third direction D3.

The second sub switch 142 between the second sub-director element 132 and the fourth sub-director element 134 may be turned on and the first sub switch 141 between the first sub-director element 131 and the third sub-director element 133 may be turned off. As a result, the second sub-director element 132 and the fourth sub-director element 134 may integrally induce the radio waves radiated from the third radiator 153 in the third direction D3. The first sub-director element 131 and the third sub-director element 133 may not be involved in the operation of the antenna 100.

The deactivated first radiator 151 may be connected to the pair of bars and may independently induce the radio waves radiated from the third radiator 153 in the third direction D3. The deactivated second and fourth radiators 152 and 154 may not be involved in the operation of the antenna 100.

As mentioned above, the third radiator 153 may radiate the radio waves, and the second/the third/the fourth main director elements 112, 113 and 114, the second/the fourth sub-director elements 132 and 134, the first main director element 111 and the first radiator 151 may induce the radio waves radiated from the third radiator 153 in the third direction D3.

Figure 5:
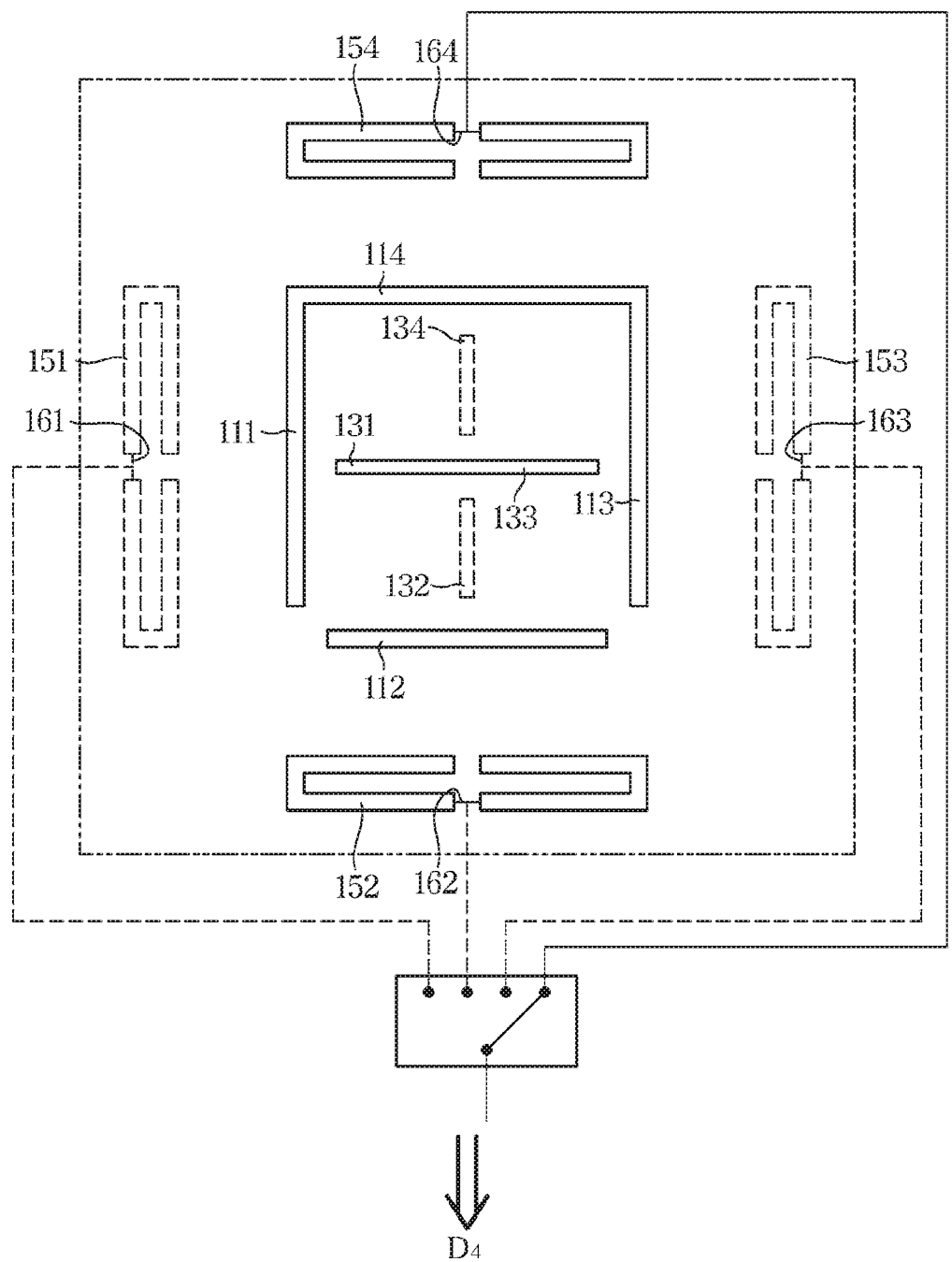
FIG. 5 is a view exemplarily illustrating that the vehicle antenna radiates radio signals in a fourth direction according to an exemplary embodiment of the present invention.

FIG. 5 is a view exemplarily illustrating that the vehicle antenna radiates radio signals in a fourth direction according to an exemplary embodiment of the present invention. FIG. 5 illustrates that the antenna 100 radiates radio waves in the fourth direction D4 and receives radio waves from the fourth direction D4.

As illustrated in FIG. 5, the selection switch 170 may connect the fourth power feeder 164 with the external device. The fourth radiator 154 may radiate the radio waves.

The third main switch 123 between the fourth main director element 114 and the third main director element 113 may be turned on. The fourth main switch 124 between the fourth main director element 114 and the first main director element 111 may be turned on. The first main switch 121 between the first main director element 111 and the second main director element 112 may be turned off. The second main switch 122 between the second main director element 112 and the third main director element 113 may be turned off. As a result, the third main director element 113, the fourth main director element 114 and the first main director element 111 may integrally induce the radio waves radiated from the fourth radiator 154 in the fourth direction D4, and the second main director element 112 may independently induce the radio waves radiated from the fourth radiator 154 in the fourth direction D4.

The first sub switch 141 between the first sub-director element 131 and the third sub-director element 133 may be turned on and the second sub switch 142 between the second sub-director element 132 and the fourth sub-director element 134 may be turned off. As a result, the first sub-director element 131 and the third sub-director element 133 may integrally induce the radio waves radiated from the fourth radiator 154 in the fourth direction D4. The second sub-director element 132 and the fourth sub-director element 134 may not be involved in the operation of the antenna 100.

The deactivated second radiator 152 may be connected to the pair of bars and may independently induce the radio waves radiated from the fourth radiator 154 in the fourth direction D4. The deactivated first and third radiators 151 and 153 may not be involved in the operation of the antenna 100.

As mentioned above, the fourth radiator 154 may radiate the radio waves, and the third/the fourth/the first main director elements 113, 114 and 111, the first/the third sub-director elements 131 and 133, the second main director element 112 and the second radiator 152 may induce the radio waves radiated from the fourth radiator 154 in the fourth direction D4.

Figure 6:
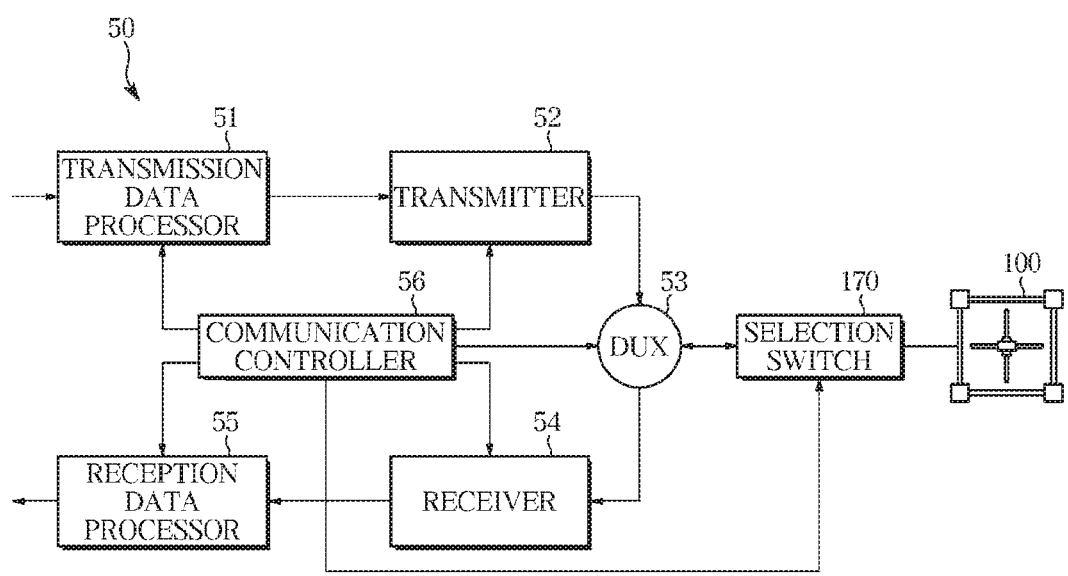
FIG. 6 is a view exemplarily illustrating a wireless communication system of the vehicle according to an exemplary embodiment of the present invention.

FIG. 6 is a view exemplarily illustrating a wireless communication system of the vehicle according to an exemplary embodiment of the present invention.

As illustrated in FIG. 6, a wireless communication system 50 may include a transmission data processor 51, a transmitter 52, a duplexer 53, a receiver 54, a reception data processor 55, a communication controller 56, and the antenna 100.

The transmission data processor 51 may convert digital transmission data received from another electronic device into a low frequency transmission signal, and provide the low frequency transmission signal to the transmitter 52.

The transmitter 52 may modulate the low frequency transmission signal into a radio frequency transmission signal using a radio frequency (RF) signal of a local oscillator.

The duplexer 53 may provide the radio frequency transmission signal received from the transmitter 52 to the antenna 100, or a radio frequency reception signal received from the antenna 100 to the receiver 54.

The receiver 54 may demodulate the radio frequency reception signal received from the duplexer 53 using the radio frequency (RF) signal of the local oscillator.

The reception data processor 55 may convert a low frequency reception signal received from the receiver 54 into digital reception data.

The communication controller 56 may control an operation of the transmission data processor 51, the transmitter 52, the duplexer 53, the receiver 54, the reception data processor 55 and the antenna 100.

The communication controller 56 may also control the selection switch 170 of the antenna 100 and the first, second, third and fourth main switches 121, 122, 123 and 124 and the first and second sub switches 141 and 142.

The antenna 100 may radiate the radar signal received from the duplexer 53 to a free space and then provide a reflection signal received from the free space to the duplexer 53.

The antenna 100 may include an antenna structure 110, a selection switch 120, and a selection controller 130.

Since the configuration and function of the antenna 100 are the same as those of the antenna 100 described above with reference to FIG. 3, the description is replaced with the configuration and function of the antenna 100 described above.

As mentioned above, the wireless communication system 50 may transmit the radio frequency transmission signal to the external device through the antenna 100, and may receive the radio frequency reception signal from the external device through the antenna 100.

Figure 7:
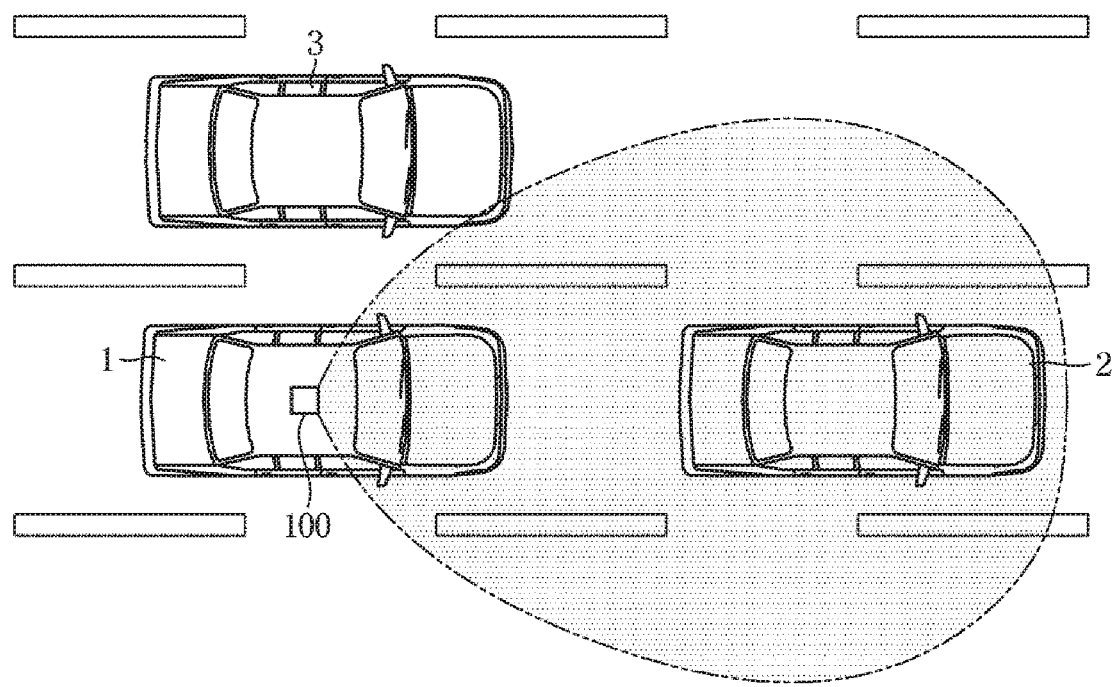
FIG. 7 and FIG. 8 are views illustrating an example in which a vehicle communicates with an external device according to an exemplary embodiment of the present invention.
Figure 8:
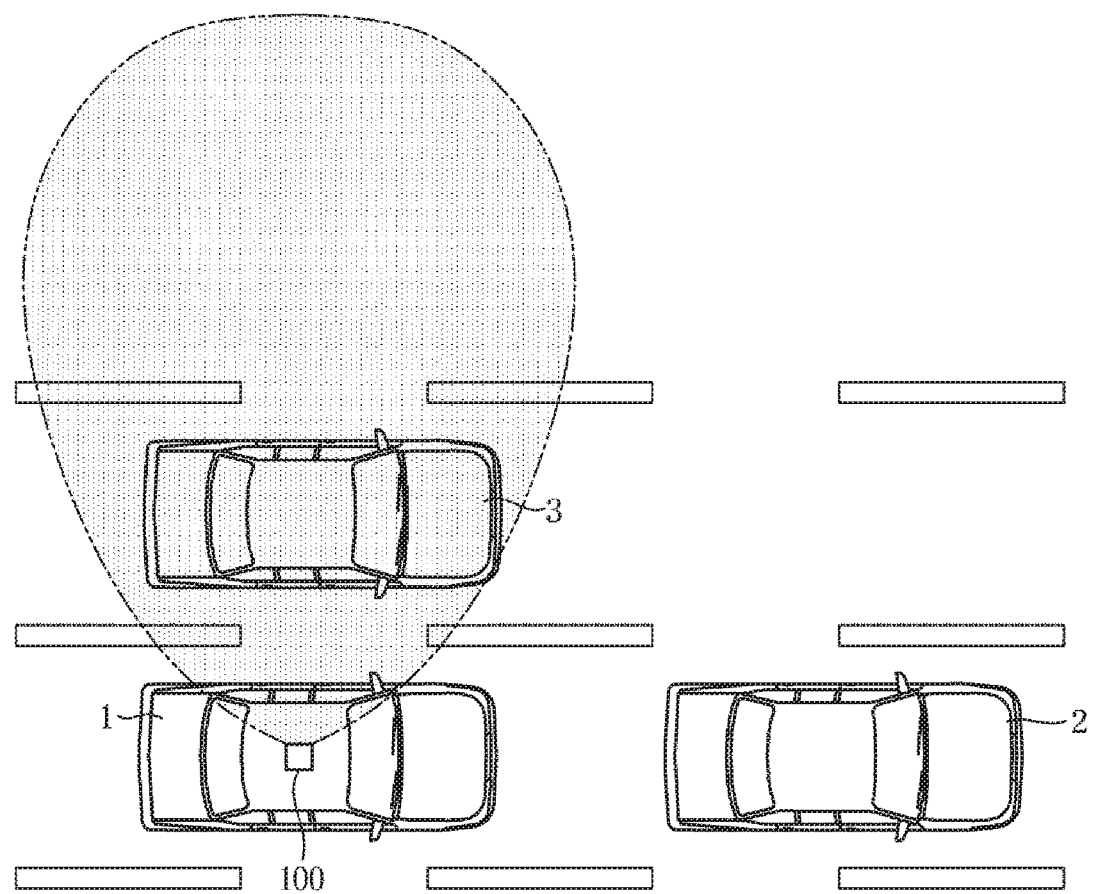

FIG. 7 and FIG. 8 are views illustrating an example in which a vehicle communicates with an external device according to an exemplary embodiment of the present invention.

The antenna 100 may be disposed at various positions of the vehicle 1. For example, as illustrated in FIGS. 7 and 8, the antenna 100 may be disposed in a roof panel of the vehicle 1. The antenna 100 may be disposed in the roof panel of the vehicle 1 such that the first radiator 151 is positioned behind the center portion of the antenna 100, the second radiator 152 is positioned to the right of the center portion of the antenna 100, the third radiator 153 is positioned forward of the center portion of the antenna 100 and the fourth radiator 154 is positioned to the left of the center portion of the antenna 100.

The direction in which the antenna 100 radiates the radio waves may be changed by the selection of a driver and the wireless communication system 50.

For example, when it is directed to communicate with another vehicle 2 in front (first direction) of the vehicle 1, the wireless communication system 50 may activate the first radiator 151 and transmit a communication signal to the antenna 100 to radiate the radio waves forward (first direction). The wireless communication system 50 may control the selection switch 170 of the antenna 100, may turn on the first and fourth main switches 121 and 124 of the antenna 100, may turn off the second and third main switches 122 and 123 of the antenna 100, may turn off the first sub switch 141 of the antenna 100, and may turn on the second sub switch 142 of the antenna 100 so that the first power feeder 161 is connected to the wireless communication system 50.

A radiation pattern as illustrated in FIG. 7 may be formed by the antenna 100, and the vehicle 1 may communicate with the another vehicle 2 located in front of the same lane.

Furthermore, when it is directed to communicate with another vehicle 2 on the left side (second direction) of the vehicle 1, the wireless communication system 50 may activate the second radiator 152 and transmit the communication signal to the antenna 100 to radiate the radio waves to the left side (second direction). The wireless communication system 50 may control the selection switch 170 of the antenna 100, may turn on the first and second main switches 121 and 122 of the antenna 100, may turn off the third and fourth main switches 123 and 124 of the antenna 100, may turn off the second sub switch 142 of the antenna 100, and may turn on the first sub switch 141 of the antenna 100 so that the second power feeder 162 is connected to the wireless communication system 50.

The radiation pattern as illustrated in FIG. 8 may be formed by the antenna 100, and the vehicle 1 may communicate with another vehicle 3 located on the left side of the adjacent lane.

Figure 9:
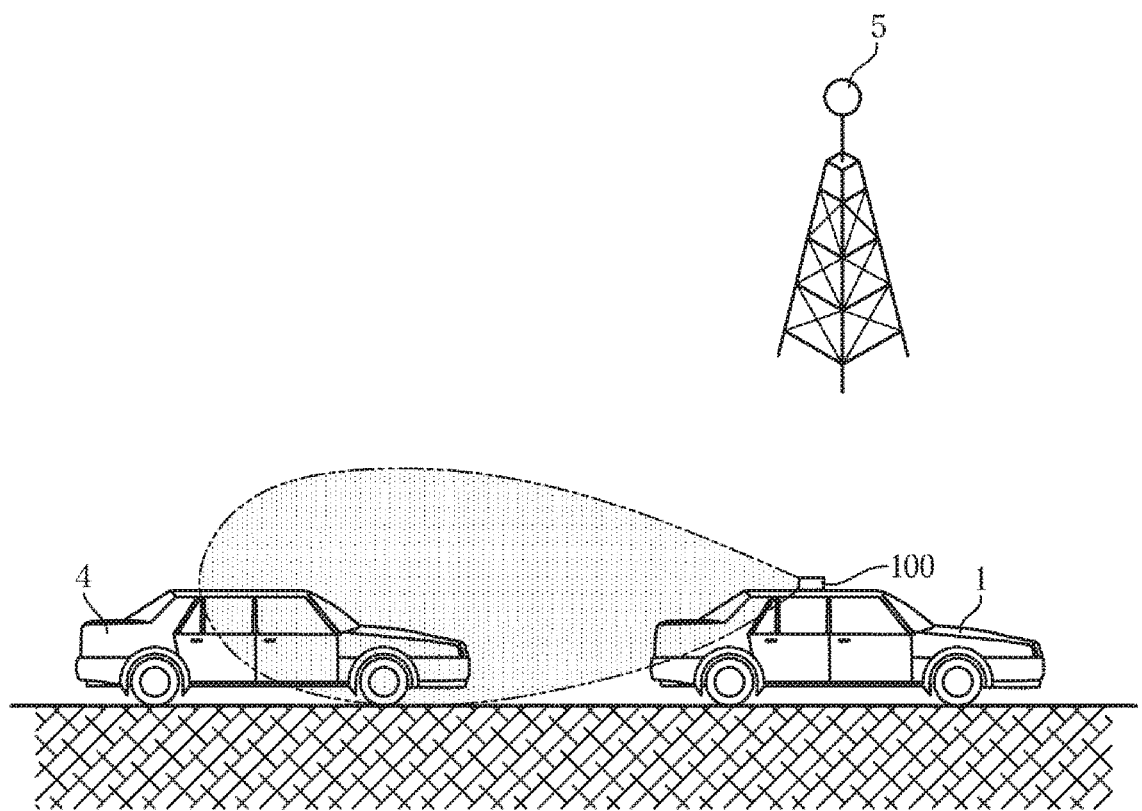
FIG. 9 and FIG. 10 are views illustrating another example in which the vehicle communicates with the external device according to an exemplary embodiment of the present invention.
Figure 10:
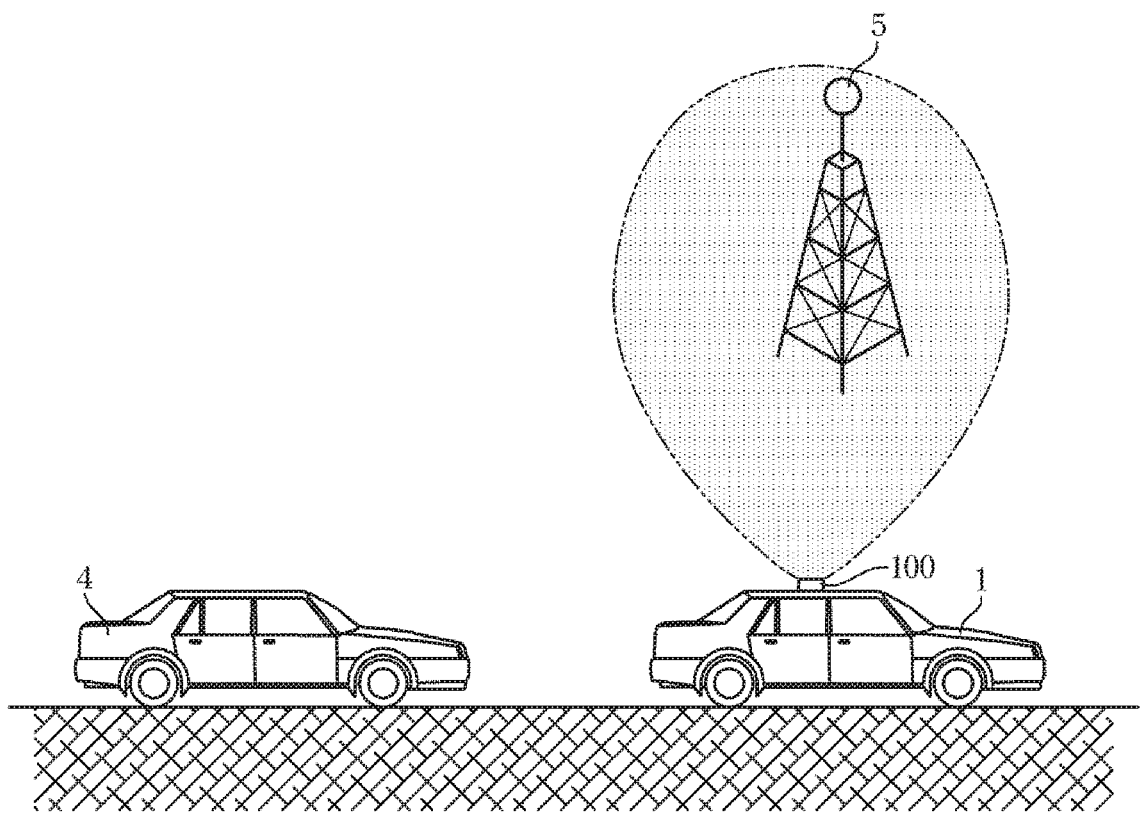

FIG. 9 and FIG. 10 are views illustrating another example in which the vehicle communicates with the external device according to an exemplary embodiment of the present invention.

As illustrated in FIG. 9 and FIG. 10, the antenna 100 may be disposed in the roof panel of the vehicle 1 such that the first radiator 151 is positioned behind the center portion of the antenna 100, the second radiator 152 is positioned above the center portion of the antenna 100, the third radiator 153 is positioned forward of the center portion of the antenna 100 and the fourth radiator 154 is positioned below the center portion of the antenna 100.

The direction in which the antenna 100 radiates the radio waves may be changed by the selection of the driver and the wireless communication system 50.

For example, when it is directed to communicate with another vehicle 4 behind (third direction) the vehicle 1, the wireless communication system 50 may activate the third radiator 153 and transmit the communication signal to the antenna 100 to radiate the radio waves backward (third direction). The wireless communication system 50 may control the selection switch 170 of the antenna 100, may turn on the second and third main switches 122 and 123 of the antenna 100, may turn off the first and fourth main switches 121 and 124 of the antenna 100, may turn off the first sub switch 141 of the antenna 100, and may turn on the second sub switch 142 of the antenna 100 so that the third power feeder 163 is connected to the wireless communication system 50.

The radiation pattern as illustrated in FIG. 9 may be formed by the antenna 100, and the vehicle 1 may communicate with the another vehicle 3 located behind the same lane.

Furthermore, when it is directed to communicate with a base station 5, the wireless communication system 50 may activate the fourth radiator 154 and transmit the communication signal to the antenna 100 to radiate the radio waves upward (fourth direction). The wireless communication system 50 may control the selection switch 170 of the antenna 100, may turn on the third and fourth main switches 123 and 124 of the antenna 100, may turn off the first and second main switches 121 and 122 of the antenna 100, may turn off the second sub switch 142 of the antenna 100, and may turn on the first sub switch 141 of the antenna 100 so that the fourth power feeder 164 is connected to the wireless communication system 50.

The radiation pattern as illustrated in FIG. 10 may be formed by the antenna 100, and the vehicle 1 may communicate with the base station 5.

As is apparent from the above description, the exemplary embodiments of the present invention may provide the directional antenna configured for radiating the radio signals in various directions.

Although exemplary embodiments of the present invention have been described for illustrative purposes, those skilled in the art will appreciate that various modifications, additions and substitutions are possible, without departing from the scope and spirit of the disclosure. Therefore, the exemplary embodiments of the present invention have not been described for limiting purposes.

Exemplary embodiments of the present invention have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. Furthermore, the components and modules may be implemented such that they execute one or more CPUs in a device.

With that being said, and in addition to the above described exemplary embodiments of the present invention, embodiments can thus be implemented through computer readable code/instructions in/on a medium, e.g., a computer readable medium, to control at least one processing element to implement any above described exemplary embodiment of the present invention. The medium can correspond to any medium/media permitting the storing and/or transmission of the computer readable code.

The computer-readable code may be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still Furthermore, as only an example, the processing element could include at least one processor or at least one computer processor, and processing elements may be distributed and/or included in a single device.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An antenna apparatus including:
    first, second, third and fourth main director elements forming a shape of a square and aligned in first, second, third and fourth directions, respectively;
    first, second, third and fourth sub-director elements extending from a center portion of the square toward the first, second, third and fourth main director elements, respectively, inside the square;
    first, second, third and fourth radiators mounted in parallel with the first, second, third and fourth main director elements, respectively, outside the square; and
    a selection switch configured to selectively connect one of the first, second, third and fourth radiators to an external device.

2. The antenna apparatus according to claim 1,
    wherein each of the first, second, third and fourth main director elements has a length of a half wavelength of a radio signal transmitted and received by the antenna apparatus, and
    wherein each of the first, second, third and fourth sub-director elements has a length of a quarter wavelength of the radio signal.

3. The antenna apparatus according to claim 1,
    wherein the first, second, third and fourth radiators include a pair of bars mounted in parallel to each other, and
    wherein the antenna apparatus further includes first, second, third and fourth power feeders, each of the first, second, third and fourth power feeders formed between the pair of bars of the first, second, third and fourth radiators, respectively.

4. The antenna apparatus according to claim 3, wherein each of the first, second, third and fourth power feeders is configured to be selectively connectable to the selection switch.

5. The antenna apparatus according to claim 4, wherein the selection switch is configured to selectively connect one of the first, second, third and fourth power feeders to the external device.

6. The antenna apparatus according to claim 3,
    wherein each of the pair of bars of the first, second, third and fourth radiators has a length of a half wavelength of the radio signal transmitted and received by the antenna, and
    wherein each of the pair of bars is configured to be folded 180° at a center thereof.

7. The antenna apparatus according to claim 1, further including:
    first, second, third and fourth main switches mounted at vertices of the square, configured to allow or block connection between adjacent main director elements among the first, second, third and fourth main director elements; and
    first and second sub switches mounted at the center portion of the square, configured to allow or block connection between sub-director elements mounted in series with each other among the first, second, third and fourth sub-director elements.

8. The antenna apparatus according to claim 7,
    wherein the first main switch is mounted at a first vertex formed by the first main director element and the second main director element among the vertices and configured to allow or block connection between the first main director element and the second main director element;
    wherein the second main switch is mounted at a second vertex formed by the second main director element and the third main director element among the vertices and configured to allow or block connection between the second main director element and the third main director element;
    wherein the third main switch is mounted at a third vertex formed by the third main director element and the fourth main director element among the vertices and configured to allow or block connection between the third main director element and the fourth main director element; and
    wherein the fourth main switch is mounted at a fourth vertex formed by the fourth main director element and the first main director element among the vertices and configured to allow or block connection between the fourth main director element and the first main director element, and wherein the first sub switch is configured to allow or block connection between the first sub-director element and the third sub-director element mounted in series with the first sub-director element; and wherein the second sub switch is configured to allow or block connection between the second sub-director element and the fourth sub-director element mounted in series with the second sub-director element.

9. The antenna apparatus according to claim 8, wherein, when the first radiator is connected to the external device by the selection switch, the first and fourth main switches are configured to turn on and the second and third main switches are configured to turn off, and the first sub switch is configured to turn off by the selection switch and the second sub switch is configured to turn on.

10. The antenna apparatus according to claim 1, wherein, when the first radiator is connected to the external device, the first main director element is configured to selectively connect to the second and fourth main director elements, and the second sub-director element is configured to selectively connect to the fourth sub-director element.

11. A vehicle including:
an antenna apparatus; and
a communication device connected to the antenna apparatus and configured to control the antenna apparatus and transmit/receive a communication signal through the antenna apparatus,
wherein the antenna apparatus includes:
first, second, third and fourth main director elements forming a shape of a square and aligned in first, second, third and fourth directions, respectively;
first, second, third and fourth sub-director elements extending from a center portion of the square toward the first, second, third and fourth main director elements, respectively, inside the square;
first, second, third and fourth radiators mounted in parallel with the first, second, third and fourth main director elements, respectively, outside the square; and
a selection switch configured to selectively connect one of the first, second, third and fourth radiators with the communication device according to a control of the communication device.

12. The vehicle according to claim 11,
wherein each of the first, second, third and fourth main director elements has a length of a half wavelength of a radio signal transmitted and received by the antenna apparatus, and
wherein each of the first, second, third and fourth sub-director elements has a length of a quarter wavelength of the radio signal.

13. The vehicle according to claim 11,
wherein the first, second, third and fourth radiators include a pair of bars mounted in parallel to each other, and
wherein the antenna apparatus further includes:
first, second, third and fourth power feeders, each of the first, second, third and fourth power feeders formed between the pair of bars of the first, second, third and fourth radiators, respectively.

14. The vehicle according to claim 13, wherein each of the first, second, third and fourth power feeders is configured to be selectively connectable to the selection switch.

15. The vehicle according to claim 14, wherein the selection switch is configured to selectively connect one of the first, second, third and fourth power feeders with the communication device according to the control of the communication device.

16. The vehicle according to claim 13,
wherein each of the pair of bars of the first, second, third and fourth radiators has a length of a half wavelength of a radio signal transmitted and received by the antenna apparatus, and
wherein each of the pair of bars is configured to be folded 180° at a center thereof.

17. The vehicle according to claim 11, wherein the antenna apparatus further includes:
first, second, third and fourth main switches mounted at vertices of the square and configured to allow or block connection between adjacent main director elements among the first, second, third and fourth main switches according to the control of the communication device; and
first and second sub switches mounted at the center portion of the square and configured to allow or block connection between sub-director elements mounted in series with each other among the first, second, third and fourth sub-director elements, according to the control of the communication device.

18. The vehicle according to claim 17,
wherein the first main switch is mounted at a first vertex formed by the first main director element and the second main director element among the vertices and configured to allow or block connection between the first main director element and the second main director element according to the control of the communication device;
wherein the second main switch is mounted at a second vertex formed by the second main director element and the third main director element among the vertices and configured to allow or block connection between the second main director element and the third main director element according to the control of the communication device;
wherein the third main switch is mounted at a third vertex formed by the third main director element and the fourth main director element among the vertices and configured to allow or block connection between the third main director element and the fourth main director element according to the control of the communication device; and
wherein the fourth main switch is mounted at a fourth vertex formed by the fourth main director element and the first main director element among the vertices and configured to allow or block connection between the fourth main director element and the first main director element according to the control of the communication device, and
wherein the first sub switch is configured to allow or block connection between the first sub-director element and the third sub-director element mounted in series with the first sub-director element according to the control of the communication device; and
wherein the second sub switch is configured to allow or block connection between the second sub-director element and the fourth sub-director element mounted in series with the second sub-director element according to the control of the communication device.

19. The vehicle according to claim 18, wherein the communication device is configured to selectively connect the first radiator to the communication device through the selection switch, to turn on the first and fourth main switches and turn off the second and third main switches, and to turn off the first sub switch and turn on the second sub switch.

20. The vehicle according to claim 11, wherein the communication device is configured to selectively connect the first radiator to an external device, to connect the first main director element to the second and fourth main director elements, and to connect the second sub-director element to the fourth sub-director element.

* * * * *